US006618049B1

(12) United States Patent
Hansen

(10) Patent No.: US 6,618,049 B1
(45) Date of Patent: *Sep. 9, 2003

(54) METHOD AND APPARATUS FOR PREPARING A PERSPECTIVE VIEW OF AN APPROXIMATELY SPHERICAL SURFACE PORTION

(75) Inventor: Paul Edward Hansen, Watsonville, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/288,661

(22) Filed: Nov. 4, 2002

Related U.S. Application Data

(63) Continuation of application No. 09/452,322, filed on Nov. 30, 1999, now Pat. No. 6,476,813.

(51) Int. Cl.[7] .............................................. G06T 15/20
(52) U.S. Cl. ....................... 345/423; 345/427; 345/428; 345/581; 345/586; 345/607
(58) Field of Search ................................. 345/423, 427, 345/428, 581, 582, 586, 607

(56) References Cited

U.S. PATENT DOCUMENTS

| 4,807,158 | A | 2/1989 | Blanton et al. |
| 5,363,475 | A | 11/1994 | Baker et al. |
| 6,028,608 | A | 2/2000 | Jenkins |
| 6,285,779 | B1 | 9/2001 | Lapidous et al. |

Primary Examiner—Mark Zimmerman
Assistant Examiner—Kimbinh T. Nguyen
(74) Attorney, Agent, or Firm—Baker Botts L.L.P.

(57) ABSTRACT

A computer system (10) can prepare and present on a display (22) a two-dimensional image that includes a perspective view, from a selected eyepoint (71, 152), of an object (23) which is a three-dimensional object of an approximately spherical shape, such as the earth. The system maintains image information for the object at each of several different resolution levels, portions of which are selected and mapped into the perspective view for respective portions of the surface of the object. In order to determine what resolution level to use for a given section of the surface of the object, the system relies on a combination of a logarithm of the square of a distance from the eyepoint to a point on the surface section, and a logarithm of the square of the degree of tilt of the surface section in relation to the eyepoint. In order to determine how far to conceptually tessellate or subdivide the surface of the object, the system relies on the logarithm of the square of the distance from the eyepoint to the point on the surface section.

20 Claims, 7 Drawing Sheets

| RESOLUTION LEVEL | TEXELS | STORAGE FORMAT |
|---|---|---|
| 0 | 1 | MIPMAP |
| 1 | 2 x 2 | |
| 2 | 4 x 4 | |
| 3 | 8 x 8 | |
| 4 | 16 x 16 | |
| 5 | 32 x 32 | |
| 6 | 64 x 64 | |
| 7 | 128 x 128 | |
| 8 | 256 x 256 | |
| 9 | 512 x 512 | |
| 10 | 1,024 x 1,024 | TEXTURE FILES |
| 11 | 2,048 x 2,048 | TEXTURE FILES |
| 12 | 4,096 x 4,096 | TEXTURE FILES |
| 13 | 8,192 x 8,192 | TEXTURE FILES |
| 14 | 16,384 x 16,384 | TEXTURE FILES |
| 15 | 32,768 x 32,768 | TEXTURE FILES |
| 16 | 65,536 X 65,536 | TEXTURE FILES |
| 17 | 131,072 X 131,072 | TEXTURE FILES |
| 18 | 262,144 X 262,144 | TEXTURE FILES |
| 19 | 524,288 x 524,288 | TEXTURE FILES |

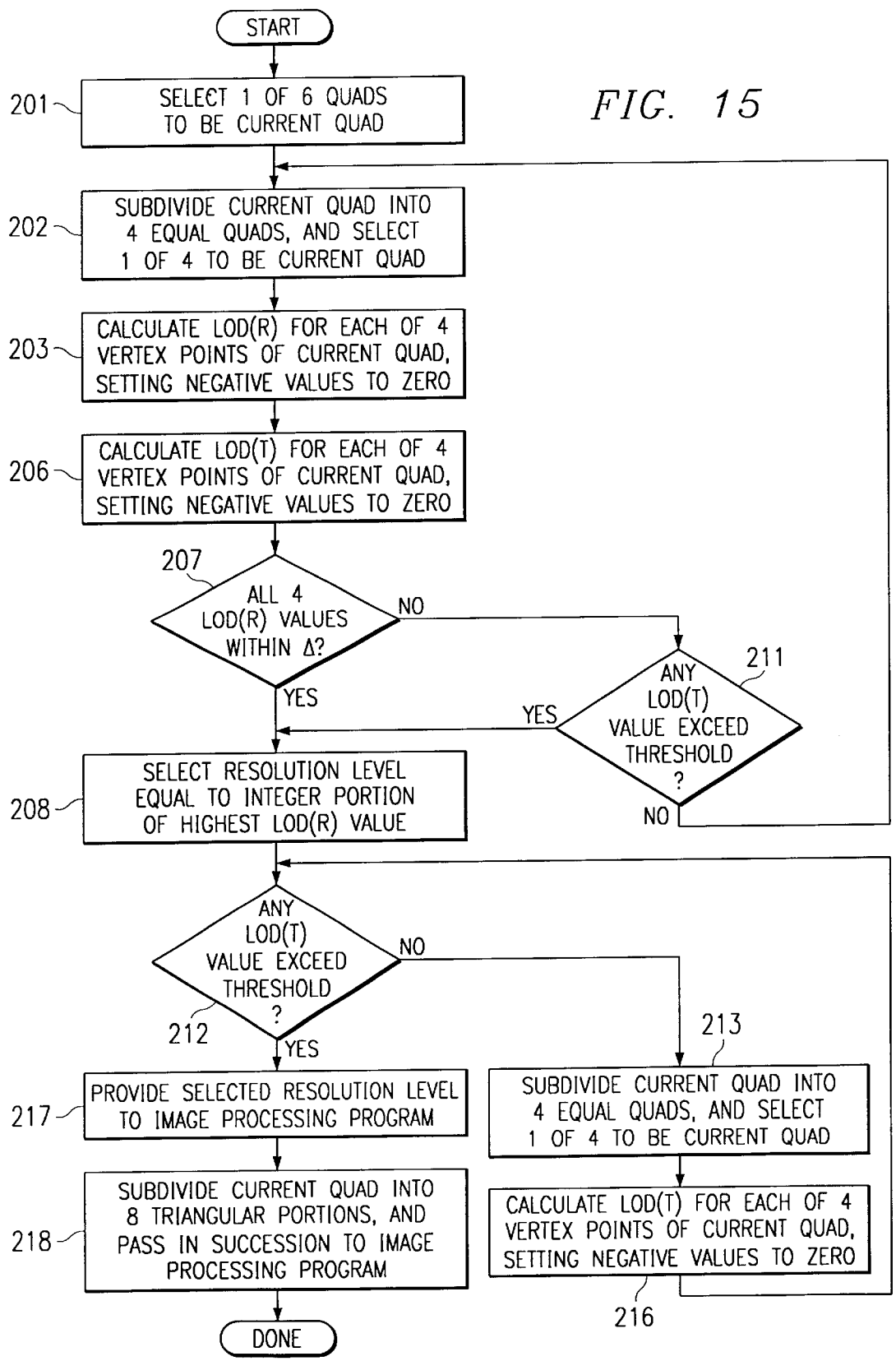

METHOD AND APPARATUS FOR PREPARING A PERSPECTIVE VIEW OF AN APPROXIMATELY SPHERICAL SURFACE PORTION

RELATED APPLICATIONS

The present application is a continuation application of U.S. application Ser. No. 09/452,322 filed Nov. 30, 1999 now U.S. Pat. No. 6,476,813.

TECHNICAL FIELD OF THE INVENTION

This invention relates in general to preparation of an image containing a perspective view of a portion of an approximately spherical surface and, more particularly, to rapid and efficient determination of level of detail information suitable for controlling various factors involved in the preparation of the perspective view, such as the resolution of image data to be used, and adaptive tessellation of the surface.

BACKGROUND OF THE INVENTION

The use of computers has rapidly increased in recent years, and a variety of different applications have evolved. One such application uses computer graphics to visually simulate a perspective view of a portion of an approximately spherical surface. For example, this might involve the preparation of a perspective view, for display on a computer monitor, of one or more planets. A planet can be viewed from many different distances and angles. Consequently, the highest resolution data is not always needed. However, when several sets of image data are provided, which each correspond to the surface of the planet at a different level of resolution, the total amount of data which must be managed can become enormous, particularly for higher resolution levels. A related consideration is that, during the process of preparing the perspective view, the surface of the planet is conceptually subdivided by the computer, to a degree sufficient to obtain an accurate mapping of the selected image data into the perspective view. This subdivision is known in the art as tessellation, and a decision need to be made as to how far to tessellate.

There are existing mapping programs which will take several sets of image data at different resolutions, and carry out calculations which select an appropriate resolution level and an appropriate degree of tessellation for each portion of the object which will appear in the perspective view. However, in order to obtain optimal, fine-grained results, these program must carry out a separate set of calculations for each vertex point of various polygons which are created during the subdivision process, and this can involve complex and extensive computations for each vertex point. In particular, these computations for each vertex point usually involve calls to one or more routines that calculate exponential functions, such as a square root value or a logarithm value, and/or calls to one or more routines that each calculate a trigonometric function, such as a sine value or cosine value, all of which are extremely time-consuming calculations for a computer. In addition, these existing programs tend to transform information to "screen space" before carrying out certain calculations, which takes up still more time.

It is possible to add specialized mapping hardware to a computer in order to support some of these programs, by performing some calculations in hardware faster than they could be performed by software. However, this increases the overall cost of the system, and still does not yield a level of speed and efficiency which is satisfactory for some applications involving tight real-time considerations. Thus, while existing programs of this type, and any associated mapping hardware, have been generally adequate for their intended purposes, they have not been satisfactory in all respects.

SUMMARY OF THE INVENTION

From the foregoing, it may be appreciated that a need has arisen for a method and apparatus which will facilitate the rapid and efficient calculation of information suitable for use in preparing an image containing a perspective view of a portion of an approximately spherical surface. According to the present invention, a method and apparatus are provided to meet this need, and involve preparing a perspective view, relative to an eyepoint, of a surface section having an approximately spherical curvature, the preparing step including the step of mapping image information from a database into the perspective view, the preparing step being carried out as a function of a logarithm of a value which in turn is a function of a distance from the eyepoint to a point on the surface section.

BRIEF DESCRIPTION OF THE DRAWINGS

A better understanding of the present invention will be realized from the detailed description which follows, taken in conjunction with the accompanying drawings, in which:

FIG. 15 is a flowchart showing a portion of a sequence of operation carried out by an application program which is executed by the system of FIG. 1, and which embodies features of the present invention.

DETAILED DESCRIPTION OF THE INVENTION

Figure 1:
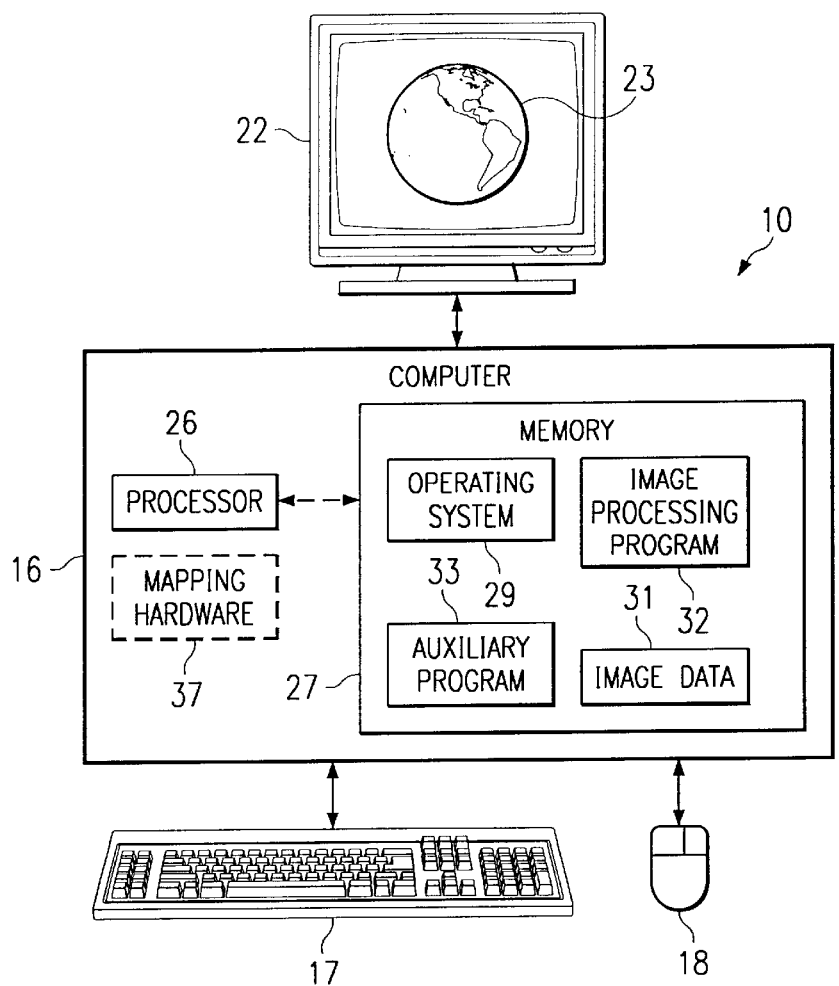
FIG. 1 is diagrammatic view of a system which embodies the present invention, and which facilitates rapid preparation of an image containing a perspective view of a portion of an approximately spherical surface.

FIG. 1 is a diagrammatic view of a system 10 which embodies the present invention. The system 10 includes a computer or system unit 16, a standard keyboard 17, a standard mouse 18, and a standard cathode ray tube (CRT) display 22. The system 10 can prepare and present on the display 22 a two-dimensional image that includes a perspective view of an object 23 which is a three-dimensional object of approximately spherical shape. For convenience in explaining the present invention, it will be assumed that there is only one spherical object 23 to be displayed, and that the object 23 is the planet earth. However, it will be recognized that the present invention could alternatively be used for a variety of other types of spherical objects, such as some other planet or a ball. Further, the present invention could be used to show several spherical objects in a single perspective view. Moreover, the present invention could be used in conjunction with a spherical surface which is only part of a complete sphere, such as a hemispherical surface.

The hardware of the computer 16 may be any of a number of existing workstations, such as the Visual Workstation 320 available commercially from Silicon Graphics, Inc. of Mountain View, Calif. The computer 16 includes a processor 26, and a memory 27 which is operatively coupled to the processor 26. For convenience, the memory 27 is shown diagrammatically in FIG. 1 as a single element, but as a practical matter it may include several different types of memory, such as a hard disk drive, a random access memory, and a read only memory. The memory 27 stores an operating system 29 which is executed by the processor 26, and which in the disclosed embodiment is an operating system available commercially under the name WINDOWS NT from Microsoft Corporation of Redmond, Wash.

The memory 27 also stores a database of image data 31. The image data 31 effectively includes several sets of image data that each represent the entire surface of the earth 23 at a respective different level of resolution. The image data 31 is discussed in more detail later.

The memory 27 also stores an image processing program 32 which is executed by the processor 26 in association with the operating system 29, and which in the disclosed embodiment is a program commercially available under the name OpenGL from Silicon Graphics Inc. of Mountain View, Calif. The image processing program 32 is capable of using the image data 31 to generate a perspective view of the object 23 for presentation on the display 22. However, given that the image data 31 includes data at various different resolutions, the image processing program 32 needs to know which resolution to use for any given portion of the object 23. In addition, the image processing program 32 needs to know how far to conceptually subdivide or "tessellate" the surface of the object 23 in order to obtain a suitable perspective view from image data at a selected resolution. Selection of an appropriate resolution and determination of an appropriate degree of tessellation are discussed in more detail later.

Although the image processing program 32 has the capability to select a resolution and determine an appropriate degree of tessellation, it has to use some relatively complex and extensive calculations, such as calls to one or more routines that calculate exponential functions such as a square root value or a logarithm value, and/or calls to one or more routines that calculate trigonometric functions such as a sine value or cosine value, as discussed previously. Due to these complex calculations, the generation of each image for presentation on the display 22 would involve a relatively significant amount of processing, and thus a relatively significant amount of time, which in turn would place limitations on the speed with which the system 10 could generate successive images for the display 22 in real time. The image processing program 32 has been entirely satisfactory for its intended purposes, but there are some applications where it is desirable to have even a higher level of performance, one example of which is that to which the disclosed embodiment is directed.

The present invention addresses this situation, and is intended to facilitate rapid generation of successive images for display on the display 22. In this regard, the memory 27 stores an auxiliary program 33, which is executed by the processor 26 in conjunction with the operating system 29, and which embodies features of the present invention. As described in more detail later, the auxiliary program 33 assists the image processing program 32 in operating faster, for example by rapidly generating a relatively accurate estimate of the resolution of data and the degree of tessellation which would be appropriate to use for any given portion of the object 23 in a particular perspective view, and by then providing this information to the image processing program 32, so that the image processing program 32 does not carry out its own computationally intensive determinations regarding resolution and tessellation.

As shown in FIG. 1, the computer 16 may optionally include mapping hardware 37, for example in the form of a circuit board which plugs into a standard bus slot. If present, the mapping hardware 37 would provide support to the image processing program 32 in mapping image information from the image data 31 into a particular perspective view for presentation on the display 22. The mapping hardware 37 simply performs certain mapping operations more efficiently than they can be performed in software by the image processing program 32. However, the speed boost provided by the mapping hardware 37 still does not yield an ultimate speed which is completely satisfactory for all applications, such as the particular application to which the disclosed embodiment is directed. Further, the hardware 37 increases the overall cost of the system. Thus, it is desirable that the present invention be able to provide satisfactory speeds for the applications of interest without use of the mapping hardware 37. Consequently, the mapping hardware 37 is shown in broken lines in FIG. 1, and it is assumed for purposes of describing the present invention that the mapping hardware is not present, in order to show a configuration of the present invention which provides satisfactory results without any mapping hardware. Of course, it will be recognized that the present invention is fully compatible with the optional use of mapping hardware, and that mapping hardware will provide yet a further speed boost.

Figure 2:
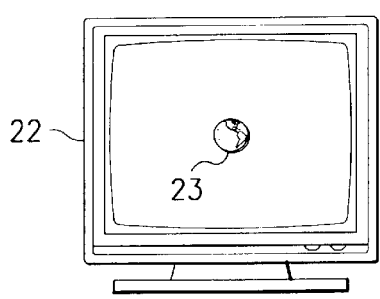
FIG. 2 is a diagrammatic view of a display which is a component of the system of FIG. 1, showing on the display an image which is different from the image on the display in FIG. 1.

As mentioned above, the image data 31 includes several sets of image data, which each represent the surface of the earth 23 at a different resolution. In order to help demonstrate why multiple resolutions are desirable, FIG. 2 is a diagrammatic view of the display 22 of FIG. 1, while it is displaying the same view of the earth 23 shown in FIG. 1, but from a much greater distance away, such that the earth 23 appears to be much smaller in FIG. 2 than in FIG. 1. The auxiliary program 33 permits a not-illustrated operator to use the mouse 18 to move the eyepoint anywhere in space relative to the earth, 23, for example so that the earth appears to fill most of the display as in FIG. 1, or so that the earth appears to be far away as in FIG. 2.

It should be evident that the perspective view of the earth 23 in FIG. 1 needs to use a substantially larger number of the pixels of the display 22 than the perspective view of the earth 23 which is shown in FIG. 2. Since fewer pixels are used for the earth in FIG. 2 than in FIG. 1, it means that image data with a lower degree of resolution could be used for FIG. 2, in comparison to the level of resolution appropriate for FIG. 1. Providing the image processing program 32 with less image data for purposes of preparing the perspective view of FIG. 2 means that the program 32 can prepare the image of FIG. 2 faster than if it had to work with the much larger amount of image data that it needs to prepare the perspective view of FIG. 1.

As a practical matter, this does not mean that the entire perspective view of the earth 23 in FIG. 1 is prepared from a single resolution. The same principle demonstrated by the foregoing discussion of FIGS. 1 and 2 actually applies to respective portions of any given perspective view as well. For example, the central portion of the earth 23 in FIG. 1 may require a higher resolution than peripheral portions at the horizon, for reasons discussed in more detail later. The same is true of FIG. 2, except that the range of suitable resolutions will be different.

Figures 3, 4, 5:
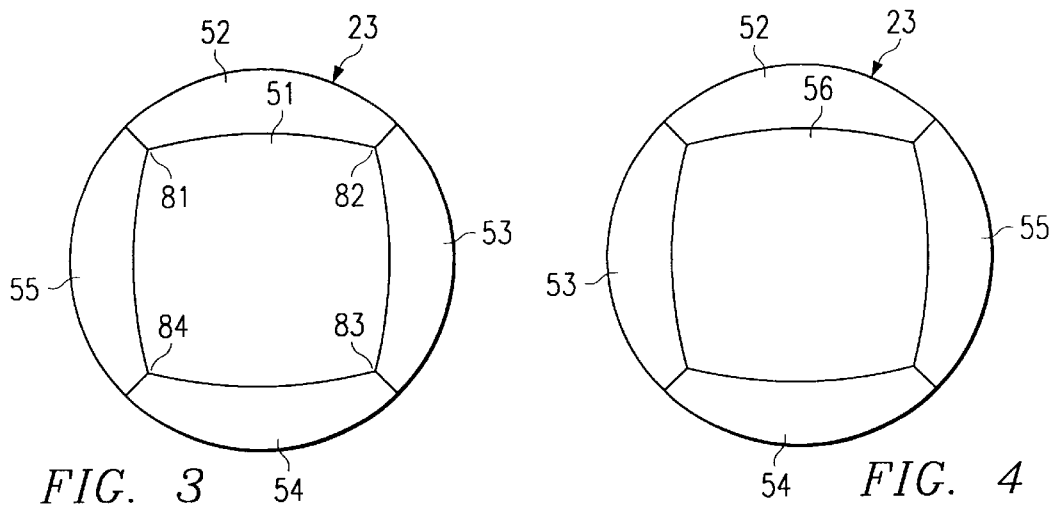
FIGS. 3 and 4 are diagrammatic views of opposite sides of the spherical object shown on the display in FIGS. 1 and 2.
FIG. 5 is a table showing various resolution levels of image data used in the system of FIG. 1.

Turning now in more detail to the organization and structure of the image data 31 used in the disclosed embodiment, FIGS. 3 and 4 are similar diagrammatic views of opposite sides of the earth 23, showing its approximately spherical surface divided into six portions 51–56 of equal size and shape. With respect to this division of the earth's surface, it may be helpful to picture the earth 23 within a not-illustrated cube, with the centerpoint of each of the six sides of the cube being tangential to the surface of the earth 23, and with all of the edges of the cube then being projected radially inwardly onto the surface of the earth. Thus, for example, the portion 51 in FIG. 3 would correspond to a respective one of the six square sides of the cube. Since the corresponding cube side is a quadrilateral, the portion 51 of the projection is referred to a quadrilateral or "quad", even though it does not lie within a plane, and even though its sides are curved once they have been projected onto the surface of the earth 23.

At each resolution level in the image data 31, there are six segments of image data that each correspond to a respective one of the quads 51–56, and which are each referred to as a texture. Although a portion of a texture could also properly be referred to as a texture, the discussion which follows will avoid doing so, in order to avoid confusion. Each texture includes one or more texture pixels, which are commonly referred to as texels. In the disclosed embodiment, as to textures for the higher levels of resolution, the textures are each based on a large number of photographs taken of different portions of the earth, for example using photographs taken from airplanes, such that each texture is a sort of patchwork quilt of the various photographs. As to lower levels of resolution in the disclosed embodiment, textures are derived from photographs taken vehicles such as satellites orbiting the earth. However, it will be recognized that other types of non-photographic image information could alternatively be used, depending on the particular application. For example, an artist's rendition of the surface of a given object might be suitable.

At the lowest level of resolution, which in the disclosed embodiment is referred to as resolution level 0, each of the six textures includes a single texel. In other words, each of the six quads 51–56 is represented by a single texel at resolution level 0. This represents a total of six texels at that resolution level. At the next highest resolution level, which is resolution level 1, each texture includes 4 texels arranged in a 2 by 2 array, or in other words a total of 24 texels at that resolution level. At the next level, which is resolution level 2, each texture includes 16 texels arranged in a 4 by 4 array. Thus, in the disclosed embodiment, the number of texels in each texture quadruples with each successive resolution level. FIG. 5 is a table showing 20 levels of resolution which are used in the disclosed embodiment, where the highest level of resolution is resolution level 19, and includes an array of 524,288 by 524,288 texels. In the image data 31 of the disclosed embodiment, the information for resolution levels 10 through 19 is stored in separate texture files, as indicated by the right column in FIG. 5. In contrast, resolution levels 0 through 9 cumulatively represent a relatively small amount of data, and are therefore all integrated into a common storage format known in the industry as a mipmap.

The foregoing discussion of FIG. 5 indicates that resolution levels 0 through 19 each include image data corresponding to the entire surface of the earth. However, it will be recognized that the highest resolution level for one portion of the earth's surface may not need to be as high as the highest resolution level for another portion of the surface. For example, a portion in the middle of the Atlantic Ocean may require less maximum resolution than a portion corresponding to New York City, where it may be desirable to be able to see streets and buildings. Thus, even within a given texture at the higher resolution levels, it would be possible to have image data for some portions of the texture but not other portions. However, for purposes of convenience and clarity in explaining the present invention, and to avoid possible confusion, resolution levels 0 through 19 of the disclosed embodiment each include image data corresponding to the entire surface of the earth.

Figure 6:
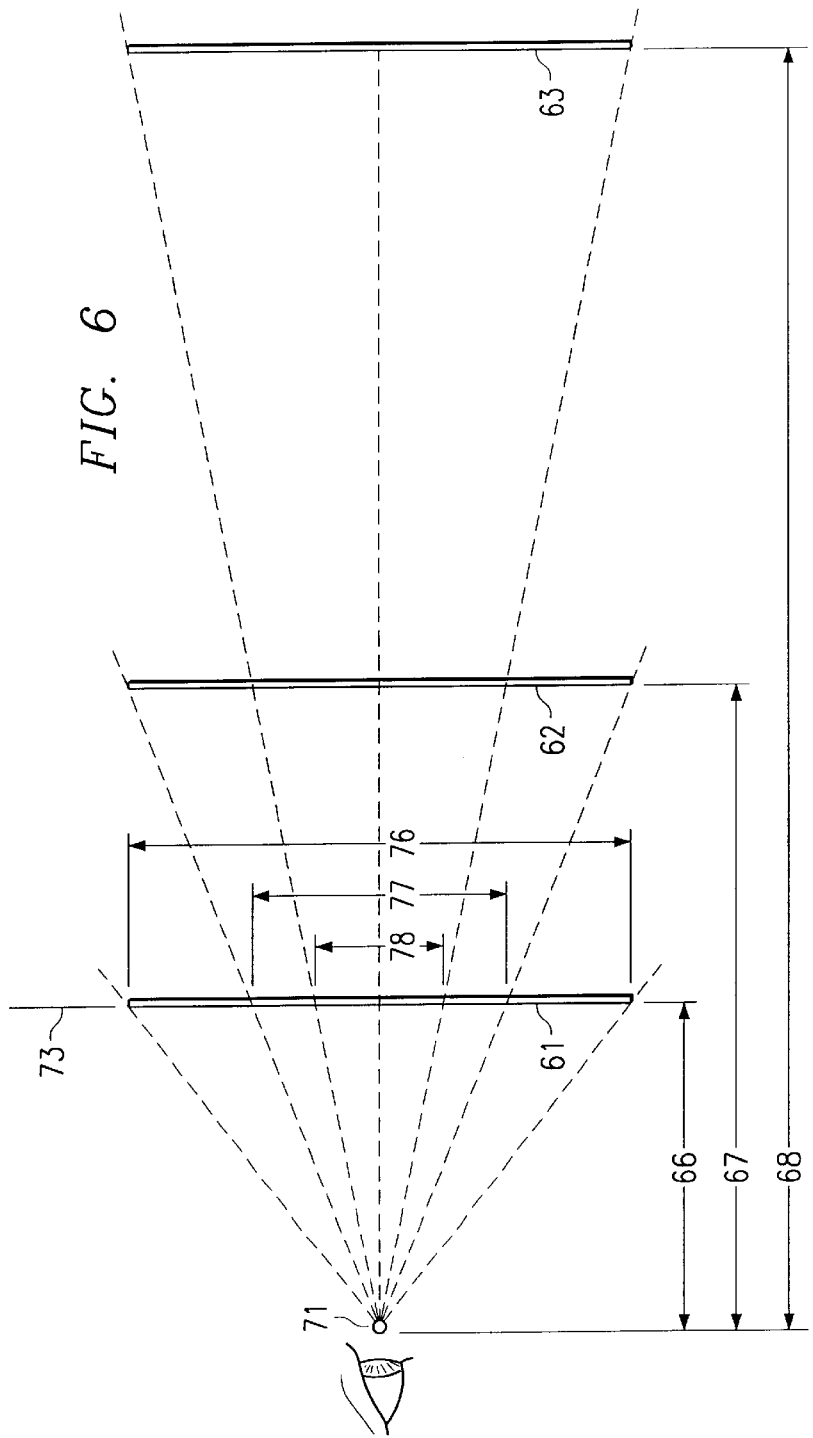
FIG. 6 is a diagrammatic view showing the relationship between the apparent size of an object and its distance from an eyepoint.

FIG. 6 is a diagrammatic view of three identical objects 61–63 which are located at respective distances 66–68 from an eyepoint 71. The object 62 is twice as far from the eyepoint 71 as the object 61. The object 63 is twice as far from the eyepoint 71 as the object 62, and four times as far from the eyepoint 71 as the object 61. Assume that the objects 61–63 are each to be projected, relative to the eyepoint 71, onto an image plane 73 which is located at the object 61, and which corresponds conceptually to the screen of the display 22 (FIG. 1). At the image plane 73, the object 61 will have a height 76 which is its actual height, the object 62 will have an apparent height 77 which is one-half its actual height, and the object 63 will have an apparent height 78 which is one-quarter its actual height. In other words, objects are reduced in apparent size in proportion to their respective distances from the eyepoint 71.

In a computer 16, the distances 66–68 would normally be represented as binary numbers, or in other words in base 2. Thus, for example, if the distance 66 happened to be $2^x$, then the distance 67 would $2^{2x}$, and the distance 68 would be $2^{4x}$. Consequently, the respective logarithms (base 2) for distances 66, 67 and 68 would be x, 2x and 4x. It will thus be noted that it is also accurate to say that each object is reduced in apparent size in proportion to the logarithm (base 2) of its respective distance from the eyepoint.

It should also be noted, for reasons discussed in more detail later, that the square of a given distance is represented by a logarithm which is simply twice the logarithm of the distance itself. For example, still assuming that distance 66 is $2^x$, the square of this distance would be $(2^x * 2^x)$, which is $2^{x+x}$, or in other words $2^{2x}$. Thus, the squares of the three distances 66–68 would respectively be $2^{2x}$, $2^{4x}$ and $2^{8x}$, and the respective logarithms (base 2) for the squares of distances 66–68 would respectively be 2x, 4x and 8x.

Consequently, it is also accurate to say that each object is reduced in apparent size in proportion to the logarithm (base 2) of the square of its respective distance from the eyepoint.

As noted above, it is assumed that the image plane 73 corresponds to the screen of the display 22, and it will thus be noted that, in the vertical direction, twice as many pixels of the display are required to represent the object 62 as to represent the object 63. Similarly, the object 61 requires twice as many pixels as the object 62, and four times as many pixels as the object 63. Thus, it will be noted that the pixel resolution required to represent each object is inversely proportional to the logarithm (base 2) of the square of the distance of that object from the eyepoint 71. The present invention therefore uses the logarithm (base 2) of the distance from an eyepoint to a point on an object in order to determine the resolution of image data which should be used in preparing a view of a portion of the object in the region of that point, as discussed in more detail later.

A further consideration is that, for a curved surface such as the surface of a sphere, image data for a given section of the surface can be mapped more accurately to the perspective view if the section of interest is subdivided or tessellated into subsections, and if the image data for each subsection is then mapped separately. An issue to be decided is how far to tessellate a given section in association with preparation of a given perspective view. This tessellation is explained in more detail below with reference to the section or quad 51 of the earth 23 (FIG. 3). It will be noted in FIG. 3 that the four vertex points of the quad 51 are designated at 81–84.

Referring to FIGS. 7–10, the quad 51 is shown diagrammatically as a square, for clarity and convenience in explaining the tessellation which is utilized in the present invention, and because the quad 51 corresponds conceptually to the square side of a cube, as discussed above. However, it should be remembered during the discussion of FIGS. 7–10 that the sides of the quad 51 actually have some curvature once the quad 51 has been projected onto the surface of the earth 23, as discussed above, and that the quad 51 is not really planar.

Figure 7:
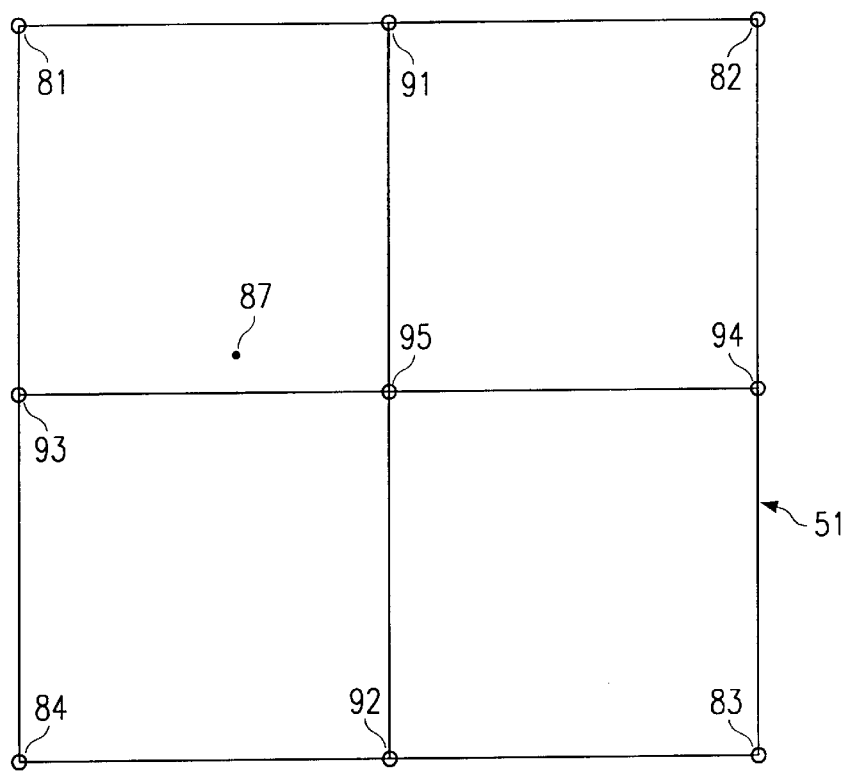
FIGS. 7–10 are similar diagrammatic views of a portion of the surface of the object shown in FIGS. 3–4, demonstrating how this portion of the surface can be successively subdivided by the system of FIG. 1.
Figure 8:
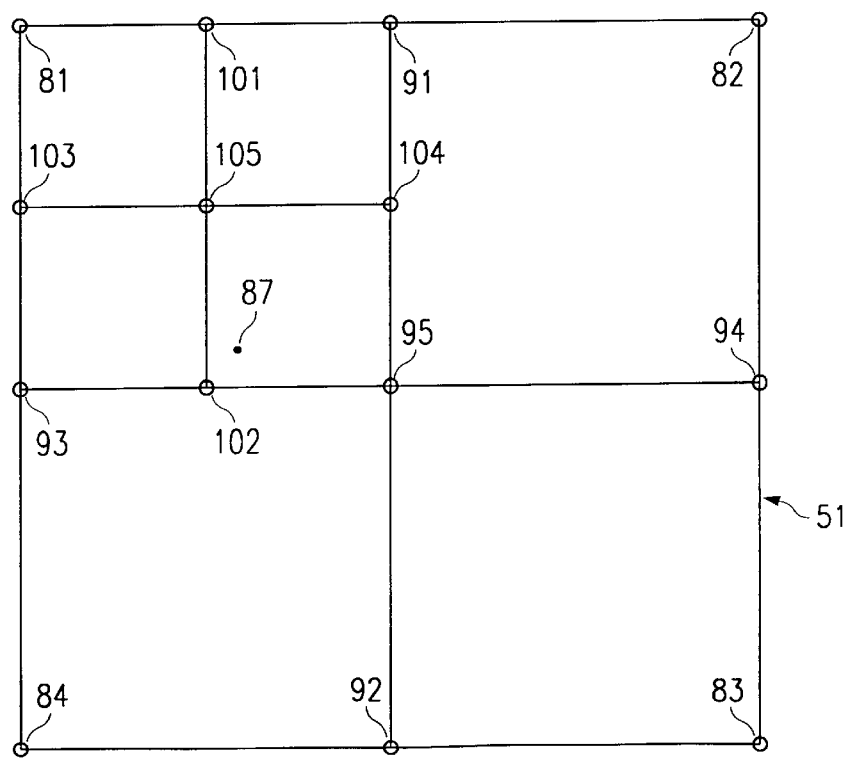

Beginning with FIG. 7, assume that the auxiliary program 33 (FIG. 1) is trying to prepare a portion of an image that corresponds to the region of a point 87 in the quad 51. The auxiliary program 33 first subdivides the quad 51 into four equal quads, by adding a line extending from point 91 to point 92, and a further line extending from point 93 to point 94, these two lines intersecting at a further point 95. The point 87 lies within the newly created quad that has vertices at 81, 91, 95 and 93. The auxiliary program 33 evaluates whether mapping this entire quad to the image will result in a sufficiently accurate image. This evaluation is made in a manner described in more detail later. Assuming that the auxiliary program 33 decides further tessellation is necessary, then as shown in FIG. 8 the auxiliary program 33 subdivides the quad having the vertices 81, 91, 95 and 93. In particular, the program 33 adds a line extending from point 101 to point 102, and a further line extending from point 103 to point 104, the two lines intersecting at a point 105. The point 87 is now within the quad having vertex points 105, 104, 95 and 102.

Figure 9:
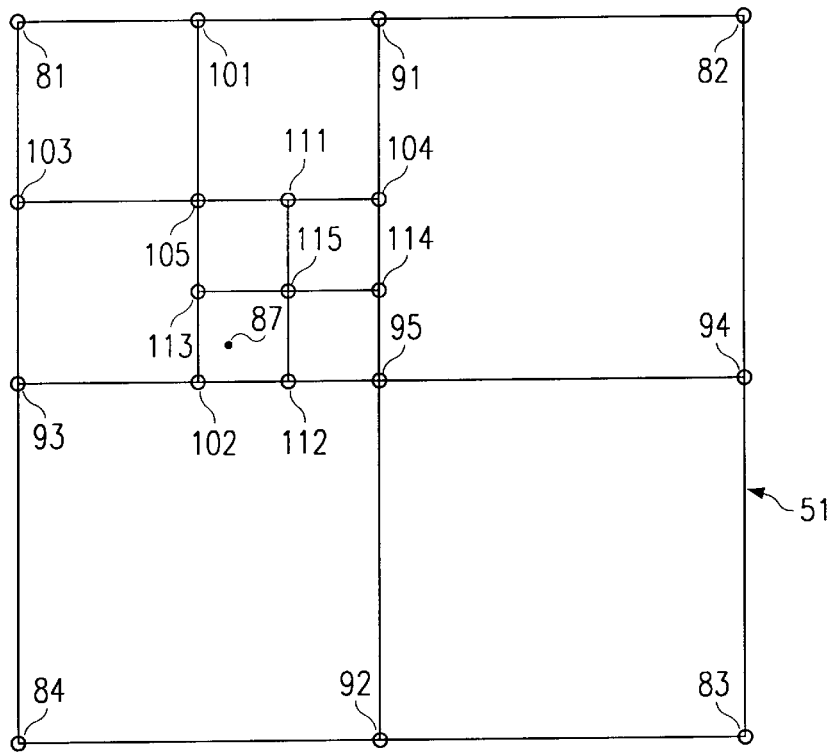

The auxiliary program 33 evaluates whether still further tessellation is necessary. Assuming that the program 33 concludes that further tessellation is necessary, then as shown in FIG. 9 it subdivides the newly-created quad which contains the point 87, namely the quad having vertices at 105, 104, 95 and 102. This is done by adding a line between points 111 and 112, and a second line between points 113 and 114, the two lines intersecting at a point 115. The point 87 is now within the quad which has vertices at 113, 115, 112 and 102.

Figure 10:
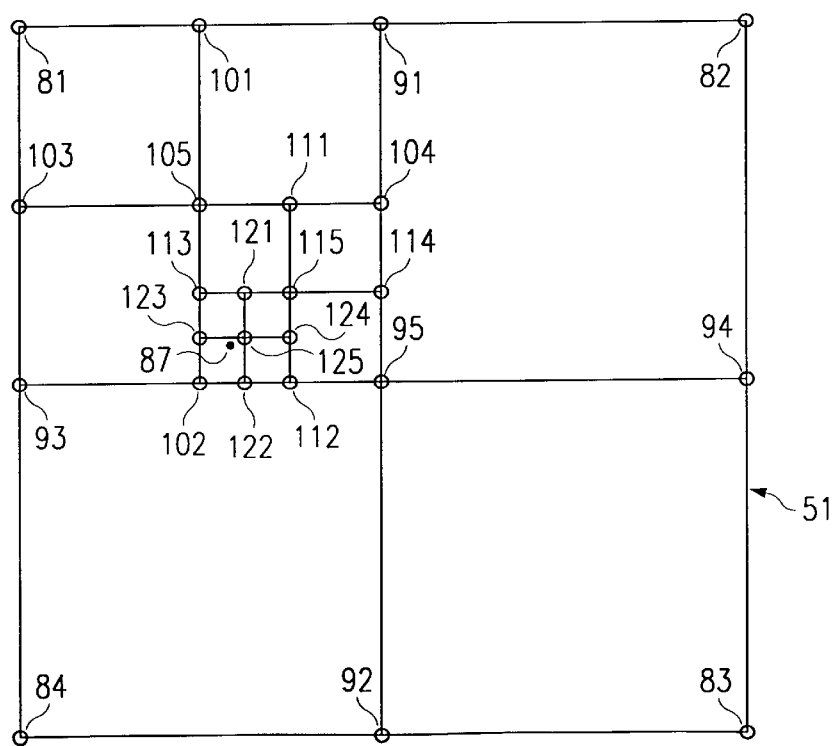

The auxiliary program 33 then makes a determination of whether still further tessellation is necessary. If so, then it subdivides the newly-created quad which now contains the point 87, or in other words the quad having vertices 113, 115, 112 and 102. In particular, as shown in FIG. 10, the program adds a line between points 121 and 122, and a further line between points 123 and 124, these two lines intersecting at a point 125. The point 87 is now within a new quad having vertex points 123, 125, 122 and 102. The auxiliary program 33 then makes an evaluation of whether still further tessellation is necessary. Tessellation proceeds progressively in the manner just described, until the auxiliary program 33 decides that no further tessellation is necessary. There is no theoretical limit on the number of levels of tessellation which could occur, and in fact this may vary from application to application. In the case of the disclosed embodiment, which involves preparing a view of the earth, the auxiliary program 33 will usually go through a minimum of at least three to five levels of tessellation, and may go as high as about twenty-five levels of tessellation.

Figure 11:
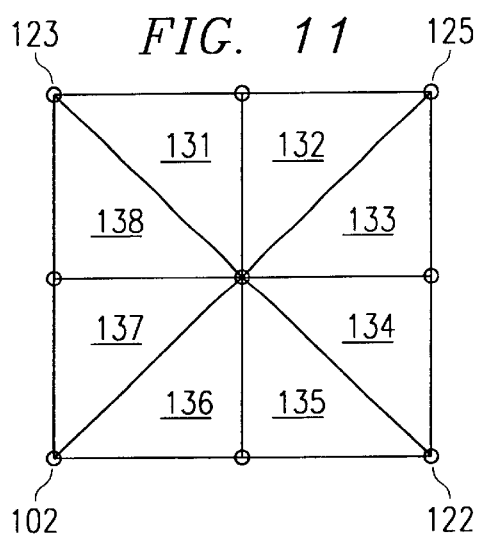
FIG. 11 is a diagrammatic view showing how a selected subsection of the surface portion of FIGS. 7–10 can be further subdivided to facilitate actual mapping of image data to the perspective view by the system of FIG. 1.

When the auxiliary program 33 decides that no further tessellation is necessary, it takes the current smallest quad containing the point 87 of interest, and prepares to instruct the image processing program 32 to map the data corresponding to this quad into the perspective view which is being prepared. In FIG. 10, this is the quad with vertices at 123, 125, 122 and 102. For optimal results, the auxiliary program 33 does not turn this particular quad over the program 32 all at once. Instead, the auxiliary program 33 turns this quad over to the image processing program 32 in eight distinct subsections. More specifically, the quad of interest in the present example is shown in FIG. 11, and the auxiliary program 33 subdivides it into eight equal triangular sections 131–138. With respect to a texture selected for use here, and corresponding to the quad 51, the auxiliary program 33 provides the program 32 with the portion of the texture that corresponds to the quad shown in FIG. 11. Then, for each of the triangular subsections 131–138, the auxiliary program 33 instructs the program 32 to successively map corresponding triangular subsections of the texture portion to the perspective image that is being prepared for presentation on the display 22.

Figure 12:
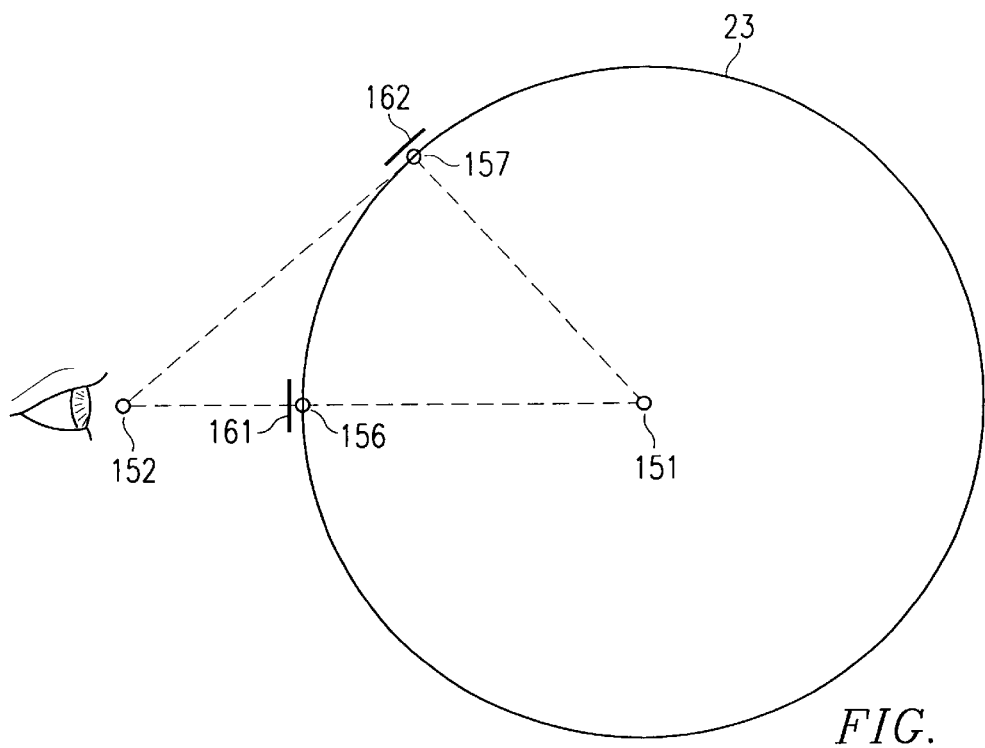
FIG. 12 is a diagrammatic view of the object of FIGS. 3–4, as viewed from a selected eyepoint, to facilitate an explanation of how image data to be mapped onto the surface of the object undergoes a foreshortening as it moves toward a horizon in relation to the selected eyepoint.

Turning now in more detail to the specific formulas used to identify an appropriate resolution level, and to determine how far to subdivide, FIG. 12 is a diagrammatic view of the earth 23, showing the centerpoint 151 of the earth, and also an arbitrary eyepoint 152. Point 156 is an arbitrary quad vertex point located on a line extending directly from the eyepoint 152 to the centerpoint 151. Point 157 is an arbitrary quad vertex point located on the horizon of the earth 23, as the horizon is perceived from the particular eyepoint 152. The line of sight extending from eyepoint 152 to vertex point 157 is tangential to the surface of the earth 23 at the point 157, and is thus perpendicular to the line which extends from point 157 to the centerpoint 151 of the earth 23.

Line segment 161 diagrammatically represents a small portion of a texture which is to be mapped onto the surface of the earth 23 in the region of point 156, and line segment 162 is a diagrammatic representation of a texture portion of identical size, which is to be mapped onto the surface in the region of point 157. It will be noted that the texture portion 161 is approximately perpendicular to the line of sight extending from eyepoint 152 to the point 156, whereas texture portion 162 is approximately parallel to the line of sight extending from eyepoint 152 to vertex point 157. If the texture portion 161 is moved along the surface of the earth 23 toward the texture portion 162, while remaining tangential to the surface, it will be noted that there is a progressively increasing tilt in its relationship to a line which extends from the eyepoint 152 to the centerpoint 151. In particular, there is a progressive increase from a tilt angle of 90° as shown at 161, to an angle of 0° as it approaches the position of texture portion 162. Thus, there is a foreshortening effect in texture portions which are progressively closer to the horizon, relative to a given eyepoint 152. Due to this foreshortening effect, the image data used for points near the horizon in FIG. 12 does not need to have as much resolution as the image data used for points remote from the horizon, such as point 156.

As discussed above in association with FIG. 6, the resolution level needed for image data varies as a function of the distance of the earth 23 from a given eyepoint. In addition, as evident from the foregoing discussion of FIG. 12, the tilt factor at a given vertex point is also relevant in determining the resolution level which is appropriate for preparing a perspective view of the surface of the earth 23 in the region of that vertex point. The present invention therefore uses a combination of the distance to and the tilt factor for any particular vertex point.

For purposes of taking the tilt factor into account, it has been arbitrarily determined that a maximum tilt value of 1.0 will be associated with vertex points which are on a line between the eyepoint 152 and the centerpoint 151 of the earth 23, such as the vertex point 156 in FIG. 12. In contrast, vertex points which are on the horizon relative to the current eyepoint 152, for example the vertex point 157, will be associated with a tilt value of 0.0. As a vertex point is moved progressively along the surface of the earth from the central point 156 to the horizon point 157, the associated tilt value will decrease progressively from the maximum value of 1.0 to the minimum value of 0.0.

Figure 13:
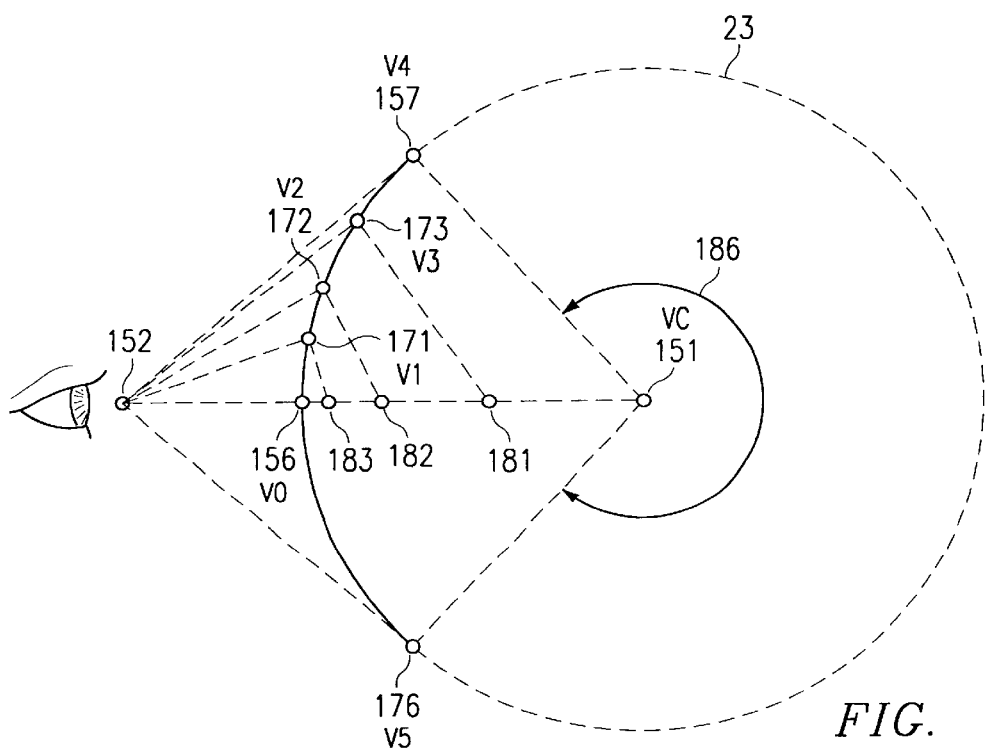
FIG. 13 is a view similar to FIG. 12, but includes additional information which facilitates an explanation of the derivation of a mathematical formula representing a tilt contribution corresponding to the foreshortening shown in FIG. 12.

The specific mathematical formula used to represent the tilt contribution is explained in association with FIG. 13, which is a variation of FIG. 12. In FIG. 13, points 171–173 are three quadrilateral vertex points on the surface of the earth 23 at respective arbitrary locations between the central vertex point 156 and the horizon vertex point 157. Point 176 is a further vertex point, which represents the opposite horizon from the vertex point 157. In the auxiliary program 33, points in space are represented in a three-dimensional Cartesian coordinate system (X,Y,Z), where the origin (0,0, 0) is located at the eyepoint 152, where the earth 23 is assumed to have a radius of 1.0, and where the Cartesian coordinates for the centerpoint 151 and the various vertex points are assigned respective Cartesian coordinates that reflect their positions relative to the eyepoint 152, and with appropriate scaling so that the earth 23 has a radius of 1.0.

The respective lines from eyepoint 152 to each of the vertex points 156, 171, 172, 173, 157 and 176 represent respective vectors v0, v1, v2, v3, v4, and v5. The line from eyepoint 152 to centerpoint 151 represents a vector vc. As discussed above, the line extending from point 157 to point 151 is perpendicular to the vector v4, and thus inherently corresponds to a reverse projection of the vector v4 onto the vector vc. Obviously, the reverse projection of vector v4 onto vector vc is vector vc itself. Point 181 is located at a position along the vector vc such that the line between points 173 and 181 is perpendicular to the vector v3. The vector v3 thus reverse projects onto the vector vc from 152 to 181. Similarly, points 182 and 183 are each points located on the vector vc in a manner so that the line between points 172 and 182 is perpendicular to vector v2, and the line between points 171 and 183 is perpendicular to vector v1. Vector v2 thus reverse projects onto the vector vc at 152 to 182, and vector v1 reverse projects onto vector vc at 152 to 183. Since vector v0 extends along the vector vc, vector v0 is its own reverse projection onto the vector vc.

It will be noted that the reverse projection of vector v3 (at 152 to 181) is a scaled version of the vector vc, which may be obtained by multiplying the vector vc by an appropriate scaling factor which is arbitrarily identified here as s3. In other words, the reverse projection of vector v3 is s3*vc. Similarly, it will be noted that the reverse projection of vector v2 (at 152 to 182) is a scaled version of the vector vc, which may be obtained by multiplying the vector vc by a different scaling factor s2.

In other words, the reverse projection of vector v2 is s2*vc. Similar scaling factors s0, s1, and s4 may be respectively associated with the respective reverse projections corresponding to vectors v0, v1 and v4.

As noted above, the reverse projection of vector v4 onto vector vc is vector vc itself, and thus the scale factor s4 is 1.0. As to vector v0, it reverse projects to s0*vc and, as mentioned above, the coordinate system has been established so that the radius of the earth 23 is 1.0. It will thus be recognized that the scale factor s0 is equal to the magnitude of vector vc minus 1.0, or in other words:

$$s0 = |vc| - 1.0 \tag{1}$$

As previously discussed, it has been decided for purposes of the present invention that the tilt factor is to vary from a value of 1.0 at vertex point 156 to 0.0 at vertex point 157. It will be recognized that this relationship can be obtained from the following formula, where sn is a generic term that can theoretically be replaced with any one of the various scale factors s0 to s4 which are discussed above:

$$\text{tilt} = |vc| - sn*|vc| \text{tilt} = |vc|*(1-sn) \tag{2}$$

In order to eliminate the term sn from equation (2), it is noted that each of the scaled vectors sn*vc minus the associated vector vn is a difference vector which is perpendicular to that vector vn. For example, with reference to vector v3, the corresponding scaled vector (at 152 to 181) minus the vector v3 is the vector extending from 173 to 181, which is perpendicular to the vector v3. The dot product of two perpendicular vectors is always equal to zero. With respect to FIG. 13, this means that:

$$(sn*vc - vn) \cdot vn = 0 \tag{3}$$

By expanding equation (3) to reflect Cartesian coordinate terms, and by then solving for sn, the following is obtained:

$$(sn*vc_x - vn_x)*vn_x + (sn*vc_y - vn_y)vn_y + \qquad (4)$$
$$(sn*vc_z - vn_z) = 0$$
$$sn = \frac{vn_x^2 + vn_y^2 + vn_z^2}{(vc_x*vn_x + (vc_y*vn_y) + (vc_z*vn_z)}$$
$$sn = \frac{|vn|^2}{vc \cdot vn}$$

With reference to equation (4), it will be noted that, on the right hand side of the equation, the numerator is the square of the length of a given vector vn, and the denominator is the dot product of the vector vc and the given vector vn.

Substituting equation (4) into equation (2) yields the following:

$$tilt = |vc| * \left(1 - \frac{|vn|^2}{vc \cdot vn}\right) \quad (5)$$

The distance from the eyepoint 152 to a given vertex point is calculated according to the well-known Pythagorean theorem, which says that the square of the distance, in this case |vn| is equal to the sum of the squares of the component distances in each of the X, Y and Z directions of the Cartesian coordinate system. In order to get the distance itself, the last step in the computation would be to take the square root of the square of the distance. However, computing a square root is relatively time-intensive for a computer. As noted above in association with the discussion of FIG. 6, the logarithm (base 2) of the square of a distance is simply twice the logarithm (base 2) of the distance itself. Consequently, the logarithm of the square of the distance is used for various purposes in the disclosed embodiment, thereby avoiding the need to actually calculate a square root, which promotes rapid preparation of perspective views.

In FIG. 13, it will be noted that only the portion of the surface between vertex points 157 and 176 is visible from the eyepoint 152. In contrast, the portion of the surface corresponding to the angle 186, which is represented by a broken line in FIG. 13, is not visible from the eyepoint 152. Geometrically, it will be noted that a given vertex point is visible from the eyepoint 152 if the distance from the eyepoint 152 to that vertex point is less than or equal to the distance from the eyepoint 152 to the vertex point 157 or 176. If the distance to a given vertex point is greater than the distance to either point 157 or 176, then that given vertex point is not visible from eyepoint 152. As discussed above in association with FIG. 6, the square of a distance can be used here as effectively as the distance itself. Consequently, in analyzing any given vertex point, one of the first things that the auxiliary program 33 does is to calculate the square of the distance from the current eyepoint 152 to the given vertex point, and then evaluate whether or not that value is above or below a reference value in order to determine whether or not the vertex point is visible. Points which are not visible are discarded or "culled" for purposes of preparing the current perspective view, so as to avoid any further processing in association with those points, which would waste processing time.

A related advantage is that, when it subsequently becomes necessary to calculate the tilt factor according to equation (5), the term |vn|² is already available and does not need to be calculated again. Further, the term |vc| which is the distance from point 152 to point 151, is a constant for preparation of a given perspective view. Consequently, aside from calculation of the dot product (vc·vn), the equation (5) uses terms which are constants or which have already been calculated, and thus the tilt factor can be very rapidly calculated according to equation (5).

In the disclosed embodiment, a first equation and a second equation are both used to control selection of an appropriate resolution level, as well as initial tessellation. Once an appropriate resolution level has been selected, then the second equation is used to determine how much further tessellation (if any) should occur. Each equation calculates a value for a given vertex point which is called a level of detail (LOD) value. The LOD value determined by the first equation, the primary purpose of which is to facilitate selection of a resolution level, is referred to as LOD(R). The LOD value determined by the second equation, the primary purpose of which is to determine when to stop tessellating, is referred to as LOD(T). The equation for LOD(R) is as follows, where K1 is a constant $$LOD(R) = K1 - (\log_2|vn|^2 - \log_2(tilt)^2) \quad (6)$$

$$LOD(R) = K1 - \left(\log_2|vn|^2 - \log_2\left(|vn| * \left(1 - \frac{|vn|^2}{vc \cdot cn}\right)\right)^2\right)$$

The equation for LOD(T) is as follows, where K2 is a constant:

$$LOD(T) = K2 - (\log_2|vn|^2) \quad (7)$$

On the right side of equation (6), the first term is the constant K1. During execution of the program 33, the constant K1 will be the same for all calculations. However, for a different computer, or for a mapping program other than the image processing program 32, a different value of K1 might be used, in order to optimize the operation of the system for factors such as the accuracy of the selection of a resolution level. Further, the constant K1 will be different in dependence on whether the calculation represented by equation (6) is carried out using single or double precision floating point numbers. In the disclosed embodiment, calculations according to equation (6) are carried out in double precision numbers, and a value of 12.0 is used for K1.

The second term on the right side of equation (6) is ($\log_2$ |vn|²). As discussed above, this value is already available and does not have to be calculated, because it was previously calculated during the culling stage, for purposes of determining whether the particular vertex point is or is not visible from the current eyepoint. Also, since the logarithm is used, and since the logarithm of the square of the distance is simply twice the logarithm of the distance, there is a linear relationship, as discussed previously. Thus, equation (6) has been intentionally developed to use the logarithm of the square of the distance, rather than something based on the distance itself, thereby avoiding the need to determine the distance value through a square root computation. This contributes to the real time speed of the program 33.

The third term of equation (6), which is subtracted from the second term), is the logarithm (base 2) of the square of the tilt contribution calculated according to equation (5). It will be noted that binary number representing the logarithm (base 2) for the unsquared tilt value can be shifted one bit to the left to obtain the logarithm (base 2) for the square of the tilt. In order to cause LOD(R) to decrease as the distance increases and as the tilt decreases, the sum of the second and third terms of equation (6) is subtracted from the first term, which is constant K1.

More specifically, with reference to equation (6), it will be noted that, as the distance increases, the second term of the equation will increase, which in turn will tend to cause the value of LOD (R) to decrease, indicating that a lower resolution is appropriate as the distance between an eyepoint and a vertex point increases. With respect to the third term of equation (6), it will be recalled from the discussion of FIG. 13 that the "tilt" value is 1.0 at the vertex point 156, and progressively decreases from the point 156 to a value of 0.0 at the vertex point 157 on the horizon. Where the tilt value is 1.0 at the vertex point 156, it will be recognized that the square of the tilt is also 1.0, and the logarithm (base 2) of the square of the tilt is 0, because 2°=1.0. Near the horizon vertex 157, where the tilt value approaches 0.0, the square of the tilt value also approaches 0.0. Since numbers between 0.0 and 1.0 have negative logarithms, the logarithm (base 2)

of the square of the tilt value approaches minus infinity near horizon vertex 157. Consequently, the third term of equation (6) decreases progressively for vertex points located progressively closer to the horizon, which in turn tends to cause the value of LOD(R) to be progressively lower for vertex points located progressively closer to the horizon, indicating that progressively lower resolutions are appropriate for vertex point which are progressively closer to the horizon. It is possible for the sum of the second and third terms in equation (6) to exceed the constant K1, but the auxiliary program 33 forces any calculated negative value of LOD(R) to a value of 0.0, so that LOD(R) can never have a negative value.

Turning to equation (7), the only differences from equation (6) are that the third term representing the tilt contribution has been omitted, and the constant K1 has been replaced with a different constant K2. During execution of the program 33, the constant K2 will be the same for all calculations. However, for a different computer, or for a mapping program other than the image processing program 32, a different value of K2 might be used, in order to optimize the operation of the system for factors such as the accuracy of the determination of the point at which to cease tessellation. Further, the constant K2 will be different in dependence on whether the calculation represented by equation (7) is carried out using single or double precision floating point numbers. In the disclosed embodiment, calculations according to equation (7) are carried out in double precision numbers, and a value of 1035.0 is used for K2.

It will be noted that equation (6) requires calculation of the dot product (vc·vn), but aside from this equations (6) and (7) use only values which are constants, or which have been previously calculated, such as $|vn^2|$ and $|vc|$. This facilitates very rapid calculation by the program 33 of the values of LOD(R), and LOD(T).

Figure 14:
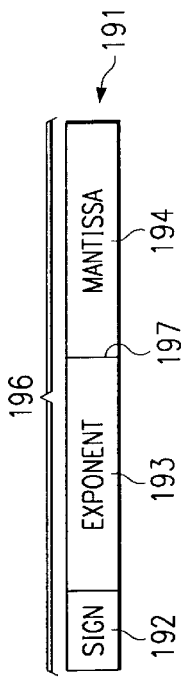
FIG. 14 is a diagrammatic view of a format used by the system of FIG. 1 to store floating point information.

There is yet a further technique which is used according to the present invention to facilitate rapid calculation of the values of LOD(R) and LOD(T) according to equations (6) and (7). More specifically, the auxiliary program 33 stores floating point numbers according to a standard commonly known as the IEEE standard, which has been promulgated by the Institute of Electrical and Electronic Engineers. FIG. 14 is a diagrammatic view of the binary word format 191 used in memory according to the IEEE standard. This format includes a sign bit 192, which is followed by a multi-bit exponent 193, which in turn is followed by a multi-bit mantissa 194. This corresponds to a number which can be expressed as:

$$1.\text{mantissa} * 2^{exponent}$$

For single-precision numbers, the exponent 193 has 7 bits and the mantissa has 23 bits, whereas for double-precision numbers the exponent 193 has 11 bits and the mantissa 194 has 52 bits. For positive numbers, the sign 192 is 0. For single-precision numbers, the exponent 193 includes an offset of 127, and for double-precision numbers the exponent 193 includes an offset of 1,023. However, the offset can be eliminated by subtracting the offset value from the exponent 193. Alternatively, if two numbers in this format are subtracted from each other, the effect of the offset will be eliminated. For example, the offset in each of the second and third terms on the right side of equation (6) is eliminated by the fact that the equation subtracts the third term from the second term.

In a computer environment which uses the IEEE standard, it is a known technique to obtain an approximation of the logarithm (base 2) of a number by treating the fields 192–194 of the floating point storage format 191 as a single field 196, where a decimal point is conceptualized at the point 197 between the exponent 193 and mantissa 194. In other words, the exponent 193 represents an integer portion of the number, and the mantissa 194 represents a fractional portion of the number. This is, of course, an approximation of the exact logarithm (base 2) for any given number, but is considered to be a relatively accurate approximation for many purposes.

Thus, with reference to the logarithm values used in equations (6) and (7), this technique is used to obtain a close approximation of the needed logarithm values in a manner which is rapid and which involves no additional calculation. Integrating this technique into the approach according to the present invention is a further factor which helps the auxiliary program 33 solve the equations (6) and (7) very rapidly.

FIG. 15 is a flowchart showing a portion of the operational sequence which is carried out by the auxiliary program 33, and which embodies features of the present invention. The sequence portion shown in FIG. 15 begins at block 201, where the auxiliary program 33 selects one of the six quads 51–56 (FIGS. 3–4) to be the current quad. Then, at block 202, the auxiliary program 33 tessellates the current quad by subdividing it into four equal quads, in the manner discussed above in association with FIGS. 7–10. The program 33 then selects one of the four resulting quads to be the new current quad.

Next, at block 203, the auxiliary program 33 calculates the LOD(R) value according to equation (6) for each of the four vertex points of the current quad, replacing any negative value of LOD(R) with zero. Then, at block 206, the auxiliary program 33 calculates the LOD(T) value according to equation (7) for each of the four vertex points of the current quad, replacing any negative value of LOD(T) with zero. Then, at block 207, the auxiliary program 33 evaluates whether the four calculated LOD(R) values are all within a predetermined constant range A. Stated differently, the program 33 determines whether the difference between the highest and lowest calculated LOD(R) values is less than Δ. If so, then control proceeds to block 208, which is described later. Otherwise, control proceeds to block 211, where the program 33 evaluates whether any one of the calculated LOD(T) values is greater than a predetermined threshold value. If so, then control proceeds to block 208, which is discussed below. Otherwise, control returns to block 202, where the program 33 repeats the subdivision step and the calculation and evaluation of LOD(R) and LOD(T) values. Tessellation continues recursively in this manner, until the program 33 determines that the condition set forth in block 207 or the condition set forth in block 211 has been met, and proceeds to block 208.

In block 208, the auxiliary program 33 selects a resolution level which is equal to the integer portion of the highest calculated LOD(R) value for the current quad. This is called "binding" to that resolution level. For example, if the highest calculated LOD(R) value had an integer portion of 12, the auxiliary program 33 would select resolution level 12 (FIG. 5). Equation (6) results in a relatively accurate determination of the same resolution level that the image processing program 32 would have selected itself, but using calculations that are much simpler and faster than those native to the program 32.

The image processing program 32 happens to operate optimally when it is given a portion of a texture file which has an array of 1,024 by 1,024 texels. In other words, this is the optimum size of texture information for the image processing program 32. With respect to resolution levels 10–19, each successive resolution level corresponds to a respective successive level of tessellation or subdivision. With respect to resolution levels 10–19, the texel array sizes shown in the center column each correspond to a quad which has the same predetermined size at all levels of the subdivision process. Thus, at resolution level 10, a texel array of 1,024 by 1,024 would correspond to a quad of this predetermined size. The image processing program 32 would be passed the entire 1,024 by 1,024 texel array for resolution level 10. At resolution level 11, the quad of predetermined size will correspond to the 2,048 by 2,048 texel array of level 11, but will have been subdivided into four equal quads which each correspond to a respective 1,024 by 1,024 portion of the 2,048 by 2,048 texel array of resolution level 11. Thus the image processing program 32 would be passed a 1,024 by 1,024 portion of the 2,048 by 2,048 array for resolution level 11. Similarly, at level 12, the degree of subdivision will be such that each quad corresponds to a 1,024 by 1,024 portion of the 4,096 by 4,096 texel array, and a 1,024 by 1,024 portion will be passed to the image processing program 32. Thus, at each of resolution levels 11–19, the corresponding level of subdivision will produce quads which each correspond to a 1,024 by 1,024 portion of the texel array set forth in the center column of FIG. 5, as a result of which the image processing program 32 will always receive a 1,024 by 1,024 texel array for each of the resolution levels 10–19, which as noted above is the optimum size of image information for which the image processing program 32 operates optimally and efficiently.

On the other hand, if the selected resolution level is one of the resolution levels 0 to 9, the image processing program 32 will simply be provided with the mipmap that contains the information for all of these resolution levels. These are relatively low levels of resolution which involve a limited amount of data, and the image processing program 32 can thus efficiently select an appropriate resolution level for itself.

After binding to a resolution level at block 208, the program 33 must determine whether to do any further tessellation. At block 212, without changing the current quad, the auxiliary program 33 evaluates whether any one of the LOD(T) values calculated according to equation (7) is greater than the predetermined threshold value mentioned above in association with block 211. In effect, block 212 performs the same operation as block 211. This is because, if control proceeded from block 207 directly to block 208, the evaluation set forth in block 211 will not yet have been made, and is therefore made at block 212. If the program 33 determines at block 212 that none of the calculated LOD(T) values exceed the threshold, then further tessellation is needed even though a resolution level has been selected, and control proceeds to block 213. At block 213 the auxiliary program 33 subdivides the current quad into four equal quads, and then selects one of the four new quads to be the current quad. Then, at block 216, the auxiliary program 33 calculates LOD(T) values for each of the four vertex points of the new current quad. Control then returns to block 212, where the program 33 checks to see whether any of the calculated LOD(T) values is in excess of the threshold value. If not, then further tessellation is needed, and the program again proceeds through the loop containing blocks 213, 216 and 212. Otherwise, if the program 33 finds at block 212 that one of the LOD(T) values has exceeded the threshold value, then no further tessellation is needed, and control proceeds to block 217.

At block 217, the auxiliary program 33 provides to the image processing program 32 an indication of the selected resolution level. This avoids providing the program 32 with several different resolution levels and then waiting for it to pick one, which for reasons discussed above can take a substantial amount of time (except in the case of several low resolutions of data in a mipmap). Then, at block 218, the current quad is subdivided into eight triangular portions in the manner discussed above in association with FIG. 11, and then the image processing program 32 is instructed to successively map the texture information corresponding to each respective triangular portion into the perspective view which is being prepared. It would be very unusual for there to be a precise one-to-one match between texels of the texture and pixels in the perspective view, but the technique of selecting a resolution level according to the present invention provides a texture with a resolution that allows the program 32 to map texels to pixels in an efficient and accurate manner.

The sequence shown in FIG. 15 is repeated for various portions of the perspective view which is being prepared, until the entire perspective view is ready to be presented on the display 22 of FIG. 1.

The present invention provides a number of technical advantages. One such advantage is that a tiled approach to preparation of a perspective view of a portion of an approximately spherical surface can be carried out extremely rapidly and efficiently. A facet of this is that the present invention facilitates fast and accurate calculation of level of detail information which can be used to control factors such as the resolution of image data selected for preparing a particular portion of the perspective view, and the level of tessellation utilized for preparing each portion of the perspective view. A related advantage is that the present invention uses simple and fast calculations to provide a relatively accurate estimate of the results of significantly more complex calculations that would normally be carried on by an associated mapping program, thereby avoiding the need for the mapping program to carry out these complex calculations, and thus increasing the speed and efficiency of the preparation by the system of a given perspective view.

A further technical advantage is that the present invention permits a mapping program to operate more rapidly and efficiently without mapping hardware support than it otherwise could even with mapping hardware, which permits system cost to be reduced through the omission of mapping hardware. A related consideration is that the present invention facilitates the use of relatively large data sets for large terrain objects, such as a planet. By using the techniques according to the invention to select appropriate resolutions of data for use by a mapping program, a perspective view can be rapidly and efficiently created, even where a very high resolution is needed and thus an enormous amount of image data must be kept on hand. Yet another technical advantage is that the present invention avoids the need to transform every vertex point to screen space before performing associated calculations for purposes of tessellating and selecting a resolution level.

Although a single embodiment of the present invention has been illustrated and described in detail, it will be recognized that there are variations and alterations which lie within the scope of the present invention. For example, the disclosed embodiment uses the specific example of a planet such as the earth, but it will be recognized that the present invention is suitable for use with virtually any type of approximately spherical object. Further, the disclosed embodiment makes an initial subdivision of the entire surface of a sphere into six quadrilaterals of equal size, and then carries out successive subdivision of these quadrilaterals by a factor of four at each level of subdivision. However, it will be recognized that other approaches to subdivision could be used. The techniques of the disclosed embodiment could also be used to control morphing of terrain elevation and other objects in association with the mapping of texture information into a perspective view.

The disclosed embodiment utilizes two different equations for calculating level of detail information in respective portions of the process for preparing a perspective view, but it will be recognized that there are modifications and variations of either or both equations which would lie within the scope of the present invention, and that advantages of the present invention could be obtained by using more than two equations, or by using only one equation. In addition, the disclosed embodiment involves preparation of a two-dimensional perspective view for display, but it will be recognized that techniques involving the present invention could be utilized in other contexts as well, such as preparation of two related two-dimensional views intended for use in some form of stereoscopic viewing environment to simulate a three-dimensional perspective view. Other substitutions and alterations are possible without departing from the spirit and scope of the present invention, as defined by the following claims.

What is claimed is:

1. A method for preparing a perspective view of a surface section having an approximately spherical curvature, comprising:

subdividing a surface section into a first plurality of subsections;

selecting a subsection from the first plurality of subsections;

determining whether the selected subsection is to be further subdivided;

selecting a resolution corresponding to the selected subsection in response to a determination that no further subdividing is to be performed;

mapping image data of the selected subsection into a perspective view for display in response to the selected resolution.

2. The method of claim 1, further comprising:

subdividing the selected subsection into a second plurality of subsections in response to a determination that further subdividing is to be performed;

selecting a subsection from the second plurality of subsections;

determining whether the selected subsection from the second plurality of subsections is to be further subdivided.

3. The method of claim 2, further comprising:

successively subdividing selected subsections until a determination is made that no further subdividing is needed.

4. The method of claim 1, further comprising:

determining a plurality of resolution values for the selected subsection;

selecting one of the resolution values for use in mapping the image data of the selected subsection into the perspective view.

5. The method of claim 4, wherein each resolution value is a function of a distance from an eyepoint to an associated vertex of the selected subsection.

6. The method of claim 4, further comprising:

setting any negative resolution values to zero;

determining whether all of the plurality of resolution values fall within a desired range.

7. The method of claim 1, further comprising:

determining a plurality of tesselation values for the selected subsection;

determining whether any of the plurality of tessellation values exceed a threshold;

initiating generation of the perspective view in response to any of the tesselation values exceeding the threshold.

8. The method of claim 1, further comprising:

determining a plurality of tesselation values for the selected subsection;

determining whether any of the plurality of tessellation values exceed a threshold;

subdividing the selected subsection into a second plurality of subsections.

9. The method of claim 8, wherein each tessellation value is a function of a degree of tilt of the selected subsection relative to an eyepoint.

10. The method of claim 1, further comprising:

partitioning the selected subsection into a plurality of portions;

mapping each of the plurality of portions into the perspective view.

11. A computer readable medium including code for preparing a perspective view of a surface section having an approximately spherical curvature, the code operable to:

subdivide a surface section into a first plurality of subsections;

select a subsection from the first plurality of subsections;

determine whether the selected subsection is to be further subdivided;

select a resolution corresponding to the selected subsection in response to a determination that no further subdividing is to be performed;

extract image data from the selected subsection in response to the selected resolution;

map image data of the selected subsection into a perspective view for display.

12. The computer readable medium of claim 11, wherein the code is further operable to:

determine a plurality of tesselation values for the selected subsection;

determine whether any of the plurality of tessellation values exceed a threshold;

initiate generation of the perspective view in response to any of the tesselation values exceeding the threshold;

subdivide the selected subsection into a second plurality of subsections in response to none of the tesselation values exceeding the threshold.

13. The computer readable medium of claim 12, wherein each tessellation value is a function of a logarithm of a square of a degree of tilt of an associated vertex of the selected subsection relative to an eyepoint.

14. The computer readable medium of claim 11, wherein the code is further operable to:

determine a plurality of resolution values for the selected subsection;

set any negative resolution values to zero;

determine whether all of the plurality of resolution values fall within a desired range;

select one of the resolution values for use in mapping the image data of the selected subsection into the perspective view in response to all of the plurality of resolution values falling within the desired range.

15. The computer readable medium of claim 14, wherein each resolution value is a function of a logarithm of a square of a distance from an eyepoint to an associated vertex of the selected subsection.

16. A system for preparing a perspective view of a surface section having an approximately spherical curvature, comprising:
- means for subdividing a surface section into a first plurality of subsections;
- means for selecting a subsection from the first plurality of subsections;
- means for determining whether the selected subsection is to be further subdivided;
- means for selecting a resolution corresponding to the selected subsection in response to a determination that no further subdividing is to be performed;
- means for extracting image data from the selected subsection according to the selected resolution means for mapping the image data of the selected subsection into a perspective view for display.

17. The system of claim 16, further comprising:
- means for determining a plurality of resolution values for the selected subsection;
- means for setting any negative resolution values to zero;
- means for determining whether all of the plurality of resolution values fall within a desired range;
- means for selecting one of the resolution values for use in mapping the image data of the selected subsection into the perspective view in response to all of the plurality of resolution values falling within the desired range.

18. The system of claim 17, further comprising:
- means for selecting a plurality of vertices in the selected subsection;
- means for calculating a resolution value at each of the selected vertices, the resolution value being a function of a logarithm of a square of a distance from an eyepoint to an associated vertex of the selected subsection.

19. The system of claim 17, further comprising:
- means for determining a plurality of tesselation values for the selected subsection;
- means for determining whether any of the plurality of tessellation values exceed a threshold;
- means for initiating generation of the perspective view in response to any of the tesselation values exceeding the threshold;
- means for subdividing the selected subsection into a second plurality of subsections in response to none of the plurality of tesselation values exceeding the threshold.

20. The system of claim 19, further comprising:
- means for selecting a plurality of vertices in the selected subsection;
- means for calculating a tesselation value at each of the selected vertices, the tesselation value being a function of a logarithm of a square of a degree of tilt of the selected subsection relative to an eyepoint at an associated vertex.

* * * * *